(12) United States Patent
Lyford et al.

(10) Patent No.: US 7,054,484 B2
(45) Date of Patent: May 30, 2006

(54) GUIDED COLOR CORRECTION SYSTEM

(76) Inventors: Kirk S. Lyford, 11612 Linnet Ct., Penn Valley, CA (US) 95946; Michael F. Schumacher, 8228 Sulphur Mtn. Rd., Ojai, CA (US) 93023; C. Larry Willett, 8228 Sulphur Mtn. Rd., Ojai, CA (US) 93023

(*) Notice: Subject to any disclaimer, the term of this patent is extended or adjusted under 35 U.S.C. 154(b) by 435 days.

(21) Appl. No.: 10/194,896

(22) Filed: Jul. 12, 2002

(65) Prior Publication Data

US 2003/0012436 A1    Jan. 16, 2003

Related U.S. Application Data

(60) Provisional application No. 60/305,654, filed on Jul. 14, 2001.

(51) Int. Cl.
 *G06K 9/00* (2006.01)
(52) U.S. Cl. ........................ 382/167; 382/254
(58) Field of Classification Search ............... 382/254, 382/260, 274, 275, 309, 311, 167; 358/2.1, 358/3.27, 518, 520, 523, 527
See application file for complete search history.

(56) References Cited

U.S. PATENT DOCUMENTS

| | | | |
|---|---|---|---|
| 4,096,523 A | 6/1978 | Belmares-Sarabia et al. | 358/80 |
| 4,679,067 A | 7/1987 | Belmares-Sarabia et al. | 358/29 |
| 4,941,057 A | 7/1990 | Lehmbeck et al. | 358/443 |
| 5,130,935 A | 7/1992 | Takiguchi | 364/526 |
| 5,182,638 A | 1/1993 | Tsuboi et al. | 358/80 |
| 5,204,736 A * | 4/1993 | Abe | 358/518 |
| 5,212,546 A | 5/1993 | Arazi et al. | 358/80 |
| 5,255,083 A | 10/1993 | Capitant et al. | 358/527 |
| 5,357,352 A | 10/1994 | Eschbach | 358/518 |
| 5,363,209 A | 11/1994 | Eschbach et al. | 358/445 |
| 5,371,615 A | 12/1994 | Eschbach | 358/515 |
| 5,377,024 A | 12/1994 | Dillinger | 358/502 |
| 5,414,538 A | 5/1995 | Eschbach | 358/522 |
| 5,450,217 A | 9/1995 | Eschbach et al. | 358/518 |
| 5,450,502 A | 9/1995 | Eschbach et al. | 382/169 |
| 5,452,018 A | 9/1995 | Capitant | 348/651 |
| 5,495,539 A | 2/1996 | Sieverding | 382/276 |
| 5,563,720 A * | 10/1996 | Edgar et al. | 358/447 |
| 5,644,647 A * | 7/1997 | Cosgrove et al. | 382/162 |
| H1684 H | 10/1997 | de Queiroz et al. | 382/233 |
| 5,694,484 A | 12/1997 | Cottrell et al. | 382/167 |
| 5,726,910 A | 3/1998 | Toma | 364/526 |
| 5,802,214 A | 9/1998 | Eschbach et al. | 382/254 |
| 5,835,627 A | 11/1998 | Higgins et al. | 382/167 |
| 5,864,634 A | 1/1999 | Kurita | 382/167 |
| 5,874,988 A | 2/1999 | Gu | 348/97 |

(Continued)

*Primary Examiner*—Vikkram Bali
*Assistant Examiner*—Colin LaRose
(74) *Attorney, Agent, or Firm*—W. D. English

(57) ABSTRACT

The invention relates to digital image enhancement, and more precisely to a guided color correction system that produces a desirable image display and reproduction. A major objective of the invention is to determine appropriate image transformations based on the user's personal preference. This is achieved by using a guided system that employs diametrically opposed or contrariwise enhancement parameter transformation previews. During the process, the user chooses the most preferred preview to determine a parameter. The amount for each parameter is determined and a final transformation is applied. The invention is designed to increase color correction speed, efficiency, and accuracy by drastically reducing the complexity and heretofore random, haphazard, and arbitrary process of conventional digital image enhancement and color correction.

12 Claims, 7 Drawing Sheets

U.S. PATENT DOCUMENTS

| | | | |
|---|---|---|---|
| 5,909,506 A | 6/1999 | Goto | 382/167 |
| 5,926,561 A | 7/1999 | Utagawa | 382/166 |
| 5,930,009 A | 7/1999 | Sato et al. | 358/518 |
| 5,946,412 A | 8/1999 | Nishikawa | 382/162 |
| 5,999,230 A | 12/1999 | Tanabe | 348/649 |
| 6,233,069 B1 | 5/2001 | Buhr et al. | 358/519 |
| 6,748,119 B1 * | 6/2004 | Bollman | 382/254 |
| 2001/0009590 A1 | 7/2001 | Holm | 382/162 |

* cited by examiner

GUIDED COLOR CORRECTION SYSTEM

U.S. Provisional Patent App. Filed 14 Jul. 2001 Ser. No. 60-305,654

BACKGROUND OF THE INVENTION

1. Field of the Invention

The invention relates to computer programs and processes for digital color correction and improving the color rendition of a digitized image. The process enables a user to change or transform an image on a computer monitor via a user's interaction with the system. More specifically, the invention relates to a guided color correction system and process that employs a series of diametrically opposed or contrariwise preview images. The user's response to the guided system determines an appropriate image transformation based on the user's personal preference and perception of the image.

2. Description of the Prior Art

Conventional digital color correction was accomplished using functions available through image editing software applications like Adobe Photoshop. The end result of such correction was accomplished through trial-and-error adjustments made by the user, which was time-consuming and imprecise.

Color correction is the process of manipulating, altering, and fine-tuning color, tone, contrast, saturation, and sharpness to enhance an image's appearance and prepare an image for display or reproduction.

Many factors, like light, can have a negative impact on photography. Sunlight is in constant flux, changing every minute of every day. Early morning and evening sun add orange and yellow to a photograph. The midday sun can wash out colors and increase contrast, and overcast skies add a blue cast to images. Indoor light sources can vary widely, as well, from a neutral Tungsten bulb to a severe green bias caused by fluorescent tubes.

Besides light, hardware devices, such as cameras, scanners, and display devices can also affect image fidelity depending on the device's mechanics, optics, and processing functions. In addition, different photographic films have unique characteristics that capture the same scene in markedly different ways. Output devices, like printers, can also alter the color with varying substrates, and pigments.

Individual perception and personal preference is also a major reason for color correcting images. No two people perceive color in exactly the same way. Physical differences in the way the eye and the brain perceive color signals, and everyone's unique emotional and psychological responses to those stimuli make color correction personal and subjective.

In most instances, the goal of color correction is to remove unwanted color casts to achieve realism, or to improve or match the original image or intent. Color correction is also used to compensate for the limitations and deficiencies of display and output devices, like monitors, desktop printers, or commercial offset printers. In addition, color correction can also be used to create a specific mood or produce unusual, surrealistic visual effects. Virtually every digital image requires some degree of color correction, so it will look its best, no matter what the final presentation may be.

Conventionally, an original image is converted to a digital file and input into a computer through a variety of means, including methods such as scanning, digital still cameras, digital video cameras, or direct art creation using a stylus and graphics tablet. During the input process, images are spatially divided into a matrix of individual segments called picture elements or pixels. These discrete pixels are encoded with an associated set of numeric values that describe the color value with fixed precision accuracy. Digital color correction is accomplished using image editing software that applies mathematical operations or transforms to the numbers that represent each pixel's color value. Applying transformations to these pixels can often result in slightly inaccurate results due to rounding errors. Applying multiple transforms to an image results in multiple rounding errors that can cause visible color artifacts to appear in the image.

The amount of color information contained in each pixel is determined by bit depth. Typically, digital color images contain three color components (RGB) with 8 bits of information per color component (3 to the $8^{th}$ power). These 24 bit images contain 16.7 million different color possibilities. High-end 48 bit images, which are also currently available, provide billions of colors possibilities.

Color information contained in a digital image is organized within a color space like RGB, (red, green, blue), which is a trichromatic color system (three color components). Computer systems use a color space such as RGB because it encompasses virtually the entire color spectrum in an efficient system. Other color spaces include HSV (hue, saturation, value), HLS (hue, lightness, saturation), CMYK, (cyan, magenta, yellow, black), and LAB (luminace, chromatic component A, chromatic component B).

Red, green, and blue (RGB) are called primary colors or additive colors. When RGB light is added together in 100 percent it produces white. All visible light can be described using combinations of these three colors. Television screens and computer monitors use additive colors to display color images.

Subtractive colors (secondary colors) are cyan, magenta, and yellow (CMY). These are referred to as subtractive because in theory when CMY colors are added together in 100 percent they produce black.

Additive and subtractive colors are exact opposites or inverse of each other. Each additive color has an opposite subtractive color. These opposite color pairs are called complementary colors, and they reside on opposite sides of a color wheel on a shared axis. Because they are inversely related, they have the opposite effect. As an example, increasing one color is the same as decreasing it's complement (i.e. +10% red=−10% cyan). Furthermore, adding any two additive colors makes a subtractive color, and vice versa.

Primary and secondary complementary color pairs are as follows:

Red (R)-Cyan (C)
Green (G)-Magenta (M)
Blue (B)-Yellow (Y)

Tertiary colors are created by mixing a primary and a secondary color. A tertiary color also has an opposite complementary color.

Once the sole domain of highly trained experts, the advent of personal computers and specialized software has made color correction available to a wide audience of often untrained individuals. All of today's popular image editing software products, like Adobe Photoshop, give the user the ability to change the appearance, and color of an image with similar tools and features. These software tools require no prior color correction experience or color theory knowledge.

Until now, digital color correction has been achieved in one of the following five ways: 1.) Color matching. 2.) Automatic processing. 3.) Manual manipulation. 4.) Comparison previews. 5.) Guided color correction.

Color matching is the process of altering the color of a source image by utilizing target values found in reference material. As an example, sky is blue, but with thousands of blue variants, achieving the correct blue is difficult. With color matching, the sky-blue is adjusted to match acceptable pixel values derived from previous artwork or color swatches. U.S. Pat. No. 5,212,546 of Efraim Arazi (1993) discloses the use of reference images in a color correction process to achieve acceptable results, but this system is flawed in a number of significant ways. Because every image is unique and one-of-a-kind, the system's effectiveness is directly limited by the quantity, variety, quality, and preparation of the reference material. As an example, to accurately correct a portrait, this system would require a similar reference image, with matching fleshtone, photographed under the same lighting condition, and reproduced using a duplicate printing process. This system requires experience and knowledge to adjust the source image to match a reference image. Additionally, this system does not provide a means for making adjustments, so the user must rely on conventional systems, which are also flawed. Because of these limitations, this system is rarely used, highly ineffective, and only suitable for general purpose adjustments that provide an overall result, which is far too imprecise for most situations.

Automatic processing functions correct an image based on a set of predefined criteria. U.S. Pat. No. 5,835,627 of Eric Higgins, et al (1998), and U.S. Pat. No. 5,874,988 of Xueming Gu (1999), disclose systems for making automatic color correction. U.S. Pat. No. 5,694,484 of F. Richard Cottrell, et al (1997) disclose an automatic color correction system designed to achieve optimal perceptual quality. Automatic enhancement systems examine and evaluate image data and make assumptions about dynamic range, color, tone, and saturation to achieve a generic or balanced result. More often than not, automatic adjustments fail to meet the user's expectations because most images are not "average". High-key or low-key images, such as snow scenes or sunsets, and images with a color dominance, like ocean scenes, landscapes, and portraits offer difficult and often insurmountable challenges to automatic processing systems. Whenever subject matter and individual color preference is not considered, the results will be less then optimal.

Manual manipulation is accomplished through the use of numerous on-screen controls, with functions such as curves, levels, color balance, hue and saturation, brightness and contrast, and other tools found in image-editing programs like Adobe Photoshop. Typically, these features permit the user to incrementally increase or decrease individual variables, while an image preview instantly updates changes to assist in the decision making process. The problem with manual manipulation is that it encourages random, haphazard corrections made through trial-and-error. The user continually makes adjustments until a desired result appears. Since guidance is not provided, there is no limitation to the number and kind of edits. As a result, this process is error-prone, and time-consuming. The user can easily become confused, and make mistakes leading to over-processing and the use of destructive, contradictory alterations. This is commonplace since most users have little or no understanding of color theory, or the complexity of color balance.

U.S. Pat. No. 4,941,057 of Donald Lehmbeck, et al (1990), U.S. Pat. No. 5,182,638 of Toshio Tsuboi, et al (1993), and U.S. Pat. No. 5,495,539 of David Sieverding (1996) disclose similar methods of color correction using multiple comparison previews, which are most often arranged in a 3×3 matrix containing nine images. Different parameters and amounts can be compared, evaluated, and selected by the user. Comparison previews are found in many popular image-editing applications including Adobe Photoshop's Variations feature. These methods attempt to simplify color correction, but again, the user is forced to make critical decisions without guidance or knowledge, making the process complex and perplexing. Any incorrect adjustment will create a new problem, so the entire process can easily spiral out of control. As an example, if counter-productive or opposing edits are applied, or if an incorrect amount is used, additional adjustments will be required to compensate for user induced error.

With guided color correction, the outcome is determined by the user's response to a step-by-step process. One such system is a software application called PhotoGenetics, by Q-Research, which is referenced herein as prior art. Photo-Genetics displays two side-by-side images. The image on the left displays the original image. The image on the right displays the source image that has been modified in a particular way. The user rates the quality of the modification using a twenty-two step sliding scale with choices from much better to worse. After the right-hand preview has been rated, the left hand image is updated and a new right-hand adaptation is displayed. This rating process continues until the user reaches a level of satisfaction with the result on the left, and decides to stop the enhancement process. The problem with this system is that the user must evaluate and rate the merits of each modification, making the process ambiguous and confusing. Since there are twenty-two possible responses for each step, this method would likely produce a different result each time it was used. Furthermore, the system does not have a finite number of steps, so the user could terminate the process prematurely, or continue excessively. The system's arbitrary process creates uncertainty and inconsistency, while indicating a lack of consideration for color theory.

With conventional systems, there simply isn't a straight-forward, succinct, and unambiguous way for a typical user to achieve accurate color correction results quickly, easily, or proficiently.

OBJECTS AND ADVANTAGES

It is therefore an object of the present invention to provide a guided color correction system and method that is easy, quick, straightforward, efficient, unambiguous, and error-free.

It is a further object of the invention to reduce time, effort, and complexity associated with conventional color correction procedures.

It is a further object of the invention to ascertain the user's personal preference and perception, and use that information to correct the image.

It is a further object of the invention to ascertain the user's subjective color preference, with regard to each image, and make alterations based on that information.

It is a further object of the invention to provide a direct and efficient means of color correction that produces a concatenated set of image transformations.

It is a further object of the invention to obtain sophisticated, accurate color correction results from untrained users who possess no prior technical understanding or skills, education, expert knowledge, or experience, and without the need of premeditation. It is a further object of the invention to provide a color correction system that does not require user supervision, intervention, control, set up, or adjustment.

It is a further object of the invention to produce a color corrected image using the fewest possible transformations, and provide a concatenated set of image transformations to eliminate opposing transformations, and avoid over processing that can lead to image degradation.

It is a further object of the invention to insure the use of a single color parameter or two contiguous color parameters.

It is a further object of the invention to systematically determine proper amounts for each adjustment parameter.

It is a further object of the invention to produce a balanced result. Color balance is attained when no transformation parameter can be added or subtracted to improve an image's appearance, based on the subjective opinion of the individual.

It is a further object of the invention to eliminate indiscriminate, random, haphazard adjustments made through trial-and-error, which can cause problems and waste time.

Further objects and advantages of the invention will become apparent from a consideration of the drawings and ensuing description.

SUMMARY OF THE INVENTION

To accomplish these objectives, the present invention employs a guided elimination process utilizing a series of diametrically opposed or contrariwise previews. With each step, the user selects the most pleasing preview, which ultimately leads to a desired result. Once the desired parameters have been selected and ordered, the amount for each parameter is determined and a final transformation is applied.

In order to better describe the present invention, the following terms are defined at the outset:

Processing Function—A function like brightness having two directional possibilities (i.e. increased brightness and decreased brightness). Complementary color pairs are a single processing function with two directional components. Each directional component of a processing function is a parameter.

Parameter—A single processing function direction (i.e. +brightness or red).

Transformation—An image adjustment made up of a single parameter amount, or multiple parameters and amounts.

Diametrically Opposed Preview—Preview images representing opposite amounts of a single processing function (i.e. +20% red and +20% cyan, or +20% brightness and −20% brightness). Or, preview images representing equal amounts of two different parameters (i.e. +20% red and +20% green).

Contrariwise Preview—Preview images representing contrary views of different parameters (i.e. +20% red and +20% yellow). Or, preview images representing contrary amounts of a single parameter (i.e. +20% brightness and +50% brightness).

To further clarify the invention's diametrically opposed or contrariwise preview selection process, assume an original image is +15% too dark, with 0% being the individual's perceived ideal. In this example, the first step is to make a pair of diametrically opposed or contrariwise brightness transformations of the original image using an equal and opposite amount. The first preview image would display a +20% brightness change, while the second preview image would display a −20% brightness change made to the original. Based on the +15% dark original image, the two diametrically opposed or contrariwise brightness previews would produce a first preview image that is 35% too dark, and a second preview image that is 5% too light. The image with a 5% differential from ideal will appear more appealing than the preview that has a 35% differential. Choosing the most preferable or appealing preview determines an enhancement direction or parameter. In this example, the lighter preview is deemed more appealing, which determines that the enhancement parameter would be to lighten the image. Once the parameter is established, the proper amount must be determined. In this example, making a 15% lighter alteration would counterbalance or neutralize the original 15% dark problem. Of course, in reality the original problem and the user's ideal would not be known. This invention is designed to guide the user through a sequential process and evaluate the user's responses to determine the proper image enhancement.

Adjusting a color is far more complex than brightness because color balance must be achieved between six inter-related color parameters instead of just two possibilities with a processing function like brightness. If the color of an image does not meet personal expectations it is deemed to have an unwanted color cast created by an excess amount of a particular color. The solution is to determine the exact inverse of the color shift and use that point as the correction to neutralize or counterbalance the perceived color shift. The correct parameter(s) and amount(s) must be determined.

Ideally, the color parameter selection process should result in either 1.) A single color adjustment parameter positioned directly on the axis between two complementary primary and secondary colors on a color wheel, 2.) or a color adjustment parameter using two contiguous primary and secondary colors on a color wheel. Contiguous color pairs are: YR, RM, MB, BC, CG, and GY (reference FIG. 4). A positive (+) adjustment of two contiguous colors can also be specified as one positive change and one negative (−) change using only RGB, or one positive change and one negative change using only CMY. As an example +20% red and +10% yellow is the same as +20% red and −10% blue, or −20% cyan and +10% yellow. Any color on the color wheel can also be made by combining the colors on either side of the intended color (e.g. R+G=Y). Opposing or counterproductive transformations should be avoided. These include the use of complementary colors, or more than two colors. The present invention is designed to isolate the proper color parameters and amounts, based on the user's subjective opinion.

The diametrically opposed or contrariwise preview comparison system can be used to determine all adjustment parameters including brightness, color, contrast, saturation, and sharpness. In addition, the invention is also beneficial for special effects, distortion, morphing, video effects, compression techniques, and other adjustments. A calibration system used to calibrate input devices, display devices, and output devices can also benefit from this system. The amount used in diametrically opposed or contrariwise comparison previews does not necessarily need to be a static value.

DETAILED DESCRIPTION OF A PREFERRED EMBODIMENTS

Figure 1:
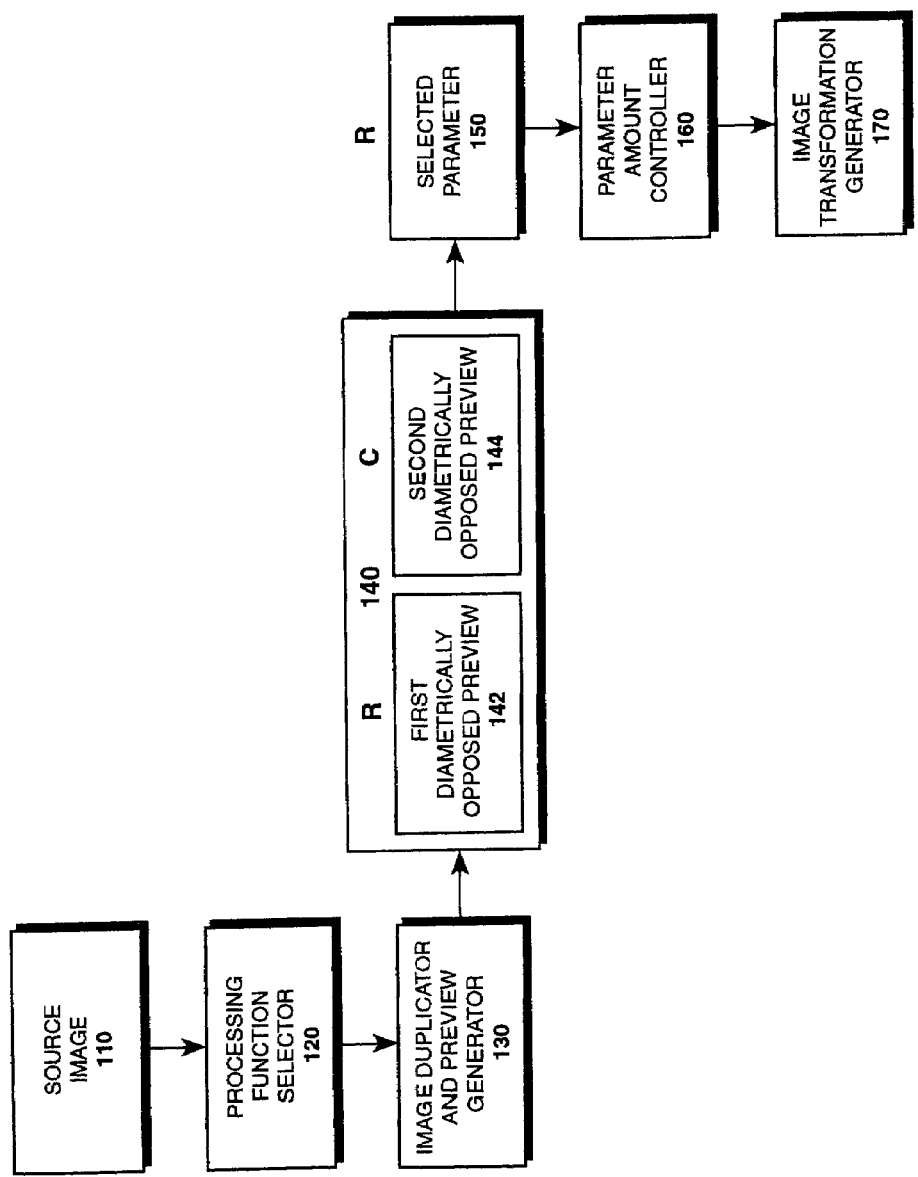
FIG. 1 is a flowchart showing a guided process used to determine a desired transformation from a selected processing function.

A flowchart in FIG. 1 details a guided process of the present invention employing diametrically opposed previews used to determine a transformation from a selected processing function. A source image 110 is created or acquired through any number of different means such as a scanner or digital camera. At a step 120, a single processing function is selected. At a step 130 the source image is duplicated and diametrically opposed previews are created using the selected processing function. The pair of diametrically opposed preview images is displayed 140. The amount of change contained in each diametrically opposed preview 142 (e.g. R) and 144 (e.g. C) should be substantial enough to clearly indicate a difference in direction. The user visually compares the diametrically opposed previews and chooses the most appealing preview from the pair to obtain a selected parameter 150 (e.g. R). The selection can be made through any number of means, including a checkbox, clicking a button, and the like. Next, the parameter amount controller 160 is used to determine an amount for the selected parameter. This can be achieved through a number of different means, including the use of sliders, image arrays, or using a series of the contrariwise previews. The final transformation 170 is recorded and/or applied to the source image.

Figure 2:
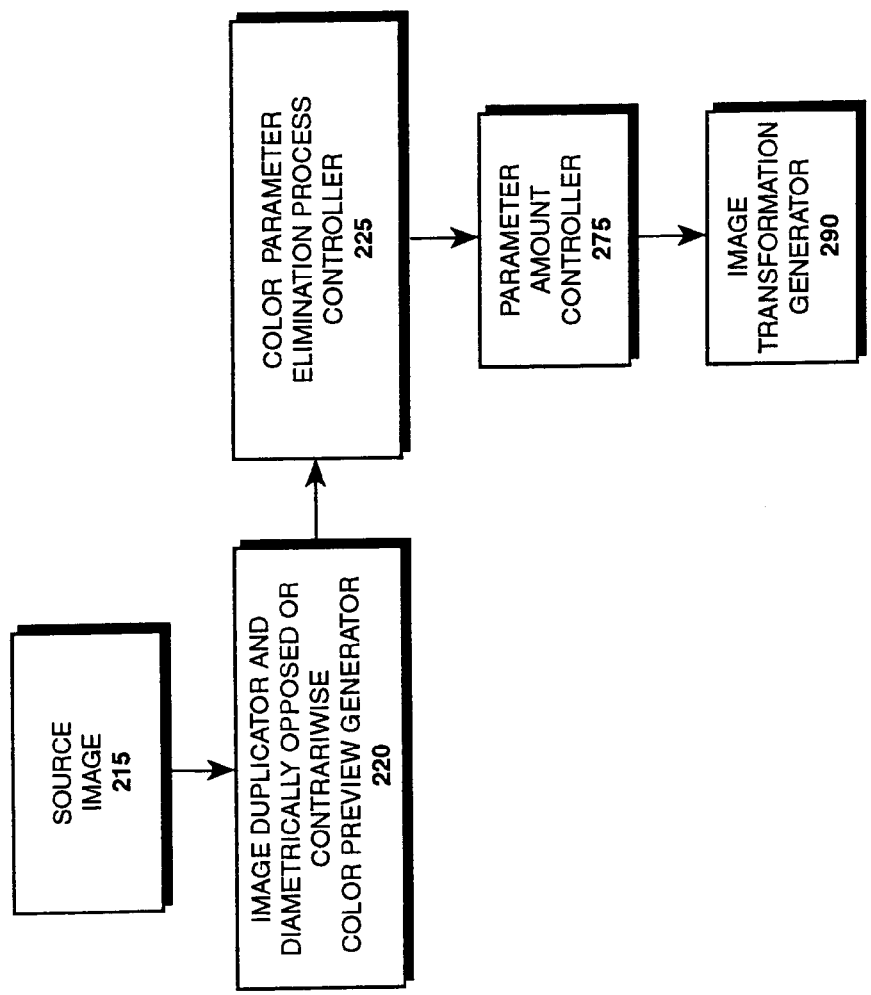
FIG. 2 is a flowchart showing a guided process used to determine a desired color transformation.

A flowchart in FIG. 2 details a guided elimination process of the present invention employing diametrically opposed or contrariwise previews used to determine a color transformation. A source image 215 is created or acquired through any number of different means such as a scanner or digital camera. At a step 220 the source image is duplicated and diametrically opposed or contrariwise color parameter transformations are applied to create a set of preview images. The amount contained in each diametrically opposed or contrariwise preview should be substantial enough to clearly indicate a difference in direction. The color parameter elimination process controller 225 displays a series of preview comparisons. The most appealing preview is selected during the sequential elimination process until only the most preferred parameters remain. The selections can be made through any number of means, including a checkbox, clicking a button, and the like. The parameter amount controller 275 is used to determine the desired amount of the most preferred parameters. This can be achieved through a number of different means, including the use of sliders, image arrays, or using a series of the contrariwise previews. The transformation generator 290 is used to record and/or apply the image transformation.

Figure 3:
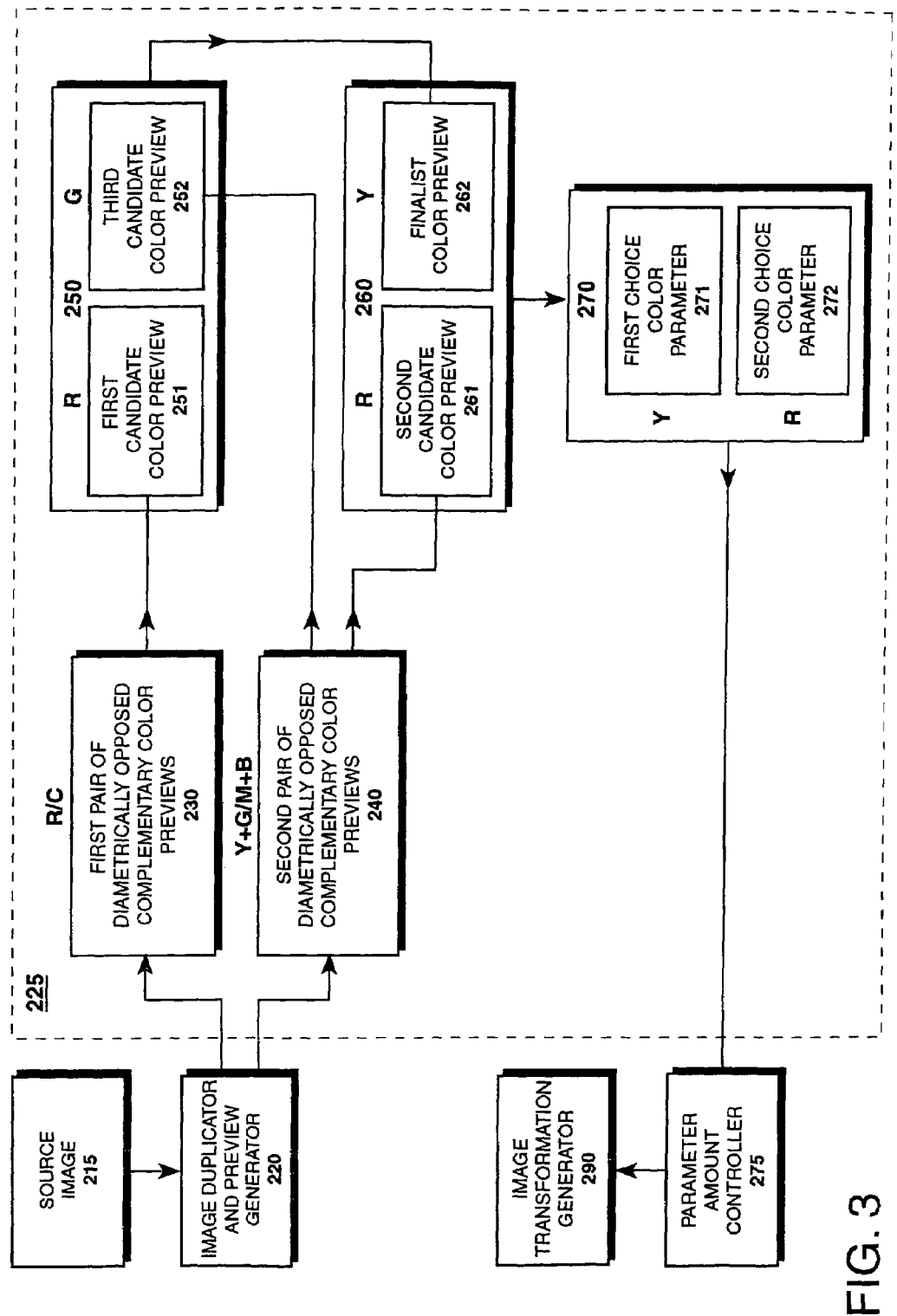
FIG. 3 is a flowchart showing a guided elimination process of the preferred embodiment used to determine a desired color transformation.

FIG. 3 is a flowchart showing a guided elimination process of the preferred embodiment of the present invention used to determine a desired color transformation. A source image 215 is acquired through any number of different means such as a scanner or digital camera. An image duplicator and preview generator 220 creates a first pair of diametrically opposed or contrariwise complementary color previews 230 (e.g. R/C). The user chooses the most preferred preview from the pair, which is recorded for later use as a first candidate color preview 251 (e.g. R). Next, the image duplicator and preview generator 220 creates a second pair of diametrically opposed or contrariwise color previews 240 (e.g. Y+G/M+B) that are perpendicular on the color wheel to the first pair of diametrically opposed complementary color previews. When using perpendicular complementary colors, one pair will contain primary and secondary colors, while the other pair will be tertiary colors. Using perpendicular complementary colors will reduce the number of steps required and insure the use of contiguous colors. At a step 240, the user chooses the most preferred preview from second preview the pair. The primary and secondary colors that were used to make the selected tertiary color are extracted to obtain a second candidate color 261 (e.g. R) and a third candidate color 252 (e.g. G). Three contiguous candidate colors now remain. At a step 250 (e.g. R/G), the first candidate color preview 251 (e.g. R) is compared with the third candidate color preview 252 (e.g. G) using a pair of contrariwise previews. By comparing the two non-adjacent candidate color preview, the elimination process can be further streamlined. The user chooses the most preferred preview from the pair, where the selected preview is recorded for later use as a finalist color preview 262 (e.g. Y). At a step 260 (e.g. R/Y) the finalist color preview 262 (e.g. Y) is compared with the second candidate color preview 261 (e.g. R) using another pair of contrariwise previews. As the preview colors get closer together on the color wheel, they become more similar and harder to distinguish. For this reason, it might be advantageous to increase the parameter amount at step 250 and again at step 260. Again, the user chooses the most appealing preview from the pair, where the selected preview becomes a first choice color parameter 270 (e.g. Y), and the unselected preview becomes the second choice color parameter 271 (e.g. R). The amount for the two final parameters is determined using the parameter amount controller 275. The amount of the first choice and second choice color parameters may be determined separately or simultaneously. The transformation generator 290 is used to record and/or apply the image transformation. The final image transformation may include both the first choice and second choice color parameters, or only a single color parameter, if one of the amounts is deemed to be unnecessary or insignificant.

The preferred embodiment has some distinct advantages over all other methods. Since a guided system requires accurate user feedback to be effective, using two preview images for each step provide the simplest, most direct, and unambiguous method. Not only can the images be displayed larger on a computer screen, the user only has two options to consider. Additionally, the preferred embodiment has the fewest possible steps, when using preview pairs. More importantly, this sequence makes certain that only contiguous colors are selected as final color parameters. Moreover, the preferred embodiment avoids the display of disturbing previews, which would likely occur if all three primary and secondary complementary color pairs were used. Since only one or two color parameters can improve an image, the other four or five parameters will produce bad looking previews. If all parameters were used, several bad previews would be displayed, causing unwanted user confusion. The preferred embodiment solves this dilemma.

Figure 4:
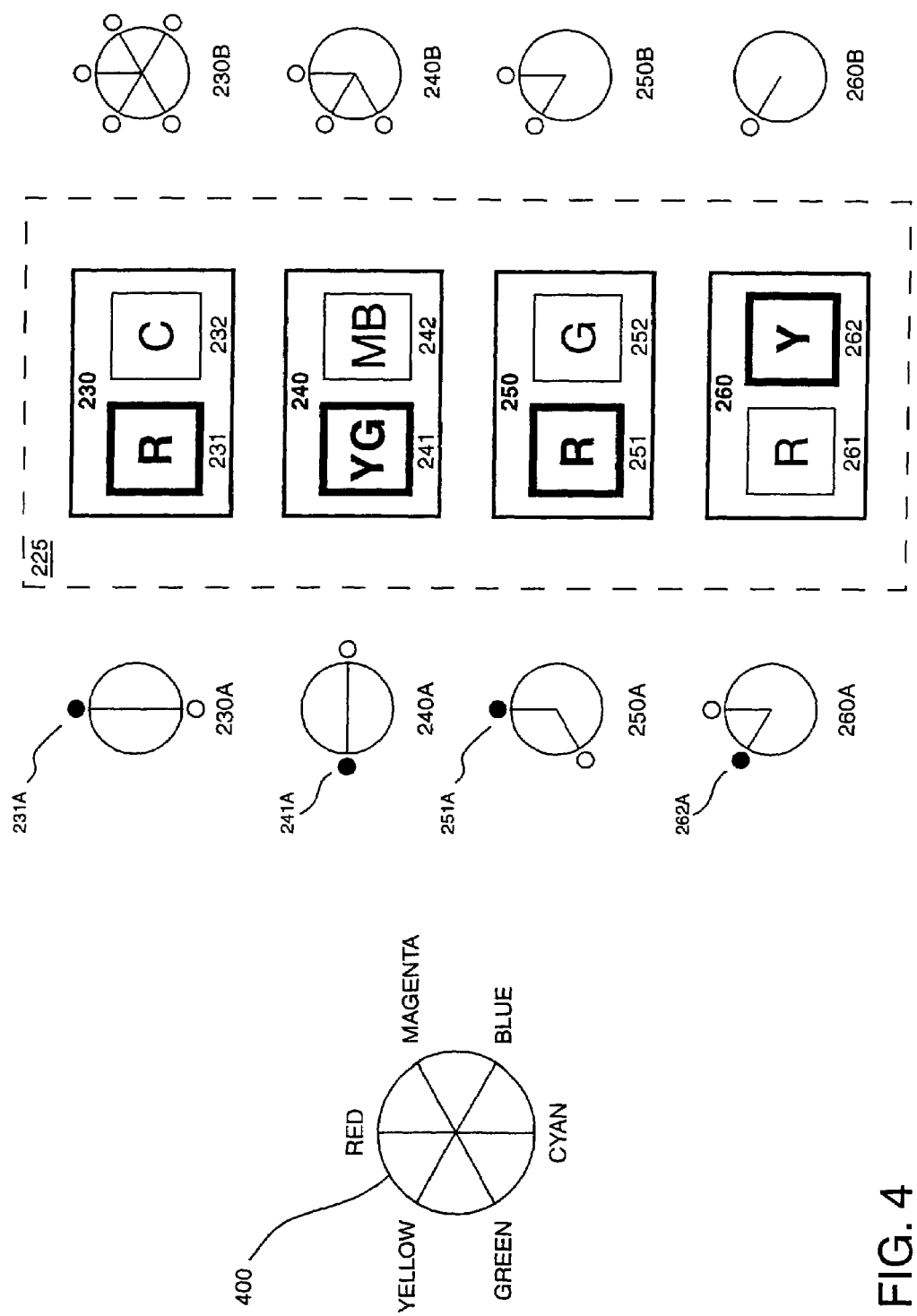
FIG. 4 is a diagram showing a representative example of the color elimination process used in the preferred embodiment.

FIG. 4 illustrates a representative example of the color parameter elimination process used in the preferred embodiment. The step-by-step color parameter elimination process 225 utilizes a series of diametrically opposed or contrariwise preview pairs 230, 240, 250, 260. Color wheels 230A, 240A, 250A, 260A coincide with the diametrically opposed or contrariwise preview pairs 230, 240, 250, 260 and show the two color choices for each step, and their associated color wheel positions. Color wheels 230B, 240B, 250B, 260B also coincide with the diametrically opposed or contrariwise preview pairs 230, 240, 250, 260 and show the remaining color parameters after each step. For reference, color wheel 400 diagrams the primary and secondary color positions. At a step 230, a first preview pair is created to compare diametrically opposed complementary colors red 231 and cyan 232. The user chooses the most appealing preview of the pair. In this example, red is selected, which is indicated by the thick outline around R 231, and the black dot 231A. The first step eliminates cyan 232 from consideration, Five color possibilities remain, as illustrated on color wheel 230B. At step 240, a second pair of diametrically opposed complementary colors are compared. These complementary are tertiary colors that are perpendicular on the color wheel to the first pair of complementary colors used in step 230. The tertiary complementary colors used are yellow-green 241 and magenta-blue 242. As indicated, yellow-green is selected, which eliminates magenta and blue from consideration. The remaining color parameters are red, yellow, and green, as illustrated on color wheel 240B. A pair of contrariwise color parameters previews 250 compares the first candidate color red 251 and the third candidate color green 252. Red and green are used because they are non-adjacent on the color wheel, which helps streamline the selection process. As indicated, green 252 is eliminated from consideration, leaving two contiguous colors as illustrated on color wheel 250B. Step 260 compares the remaining two color parameters, red 261 and yellow 262. The user picks the most preferred color preview, which becomes the first choice color parameter. In this example, yellow 262 is selected. The unselected color red 261 becomes the second choice color parameter. This example illustrates one possible outcome, but the same basic procedure can be used to achieve all possible results.

Figure 5:
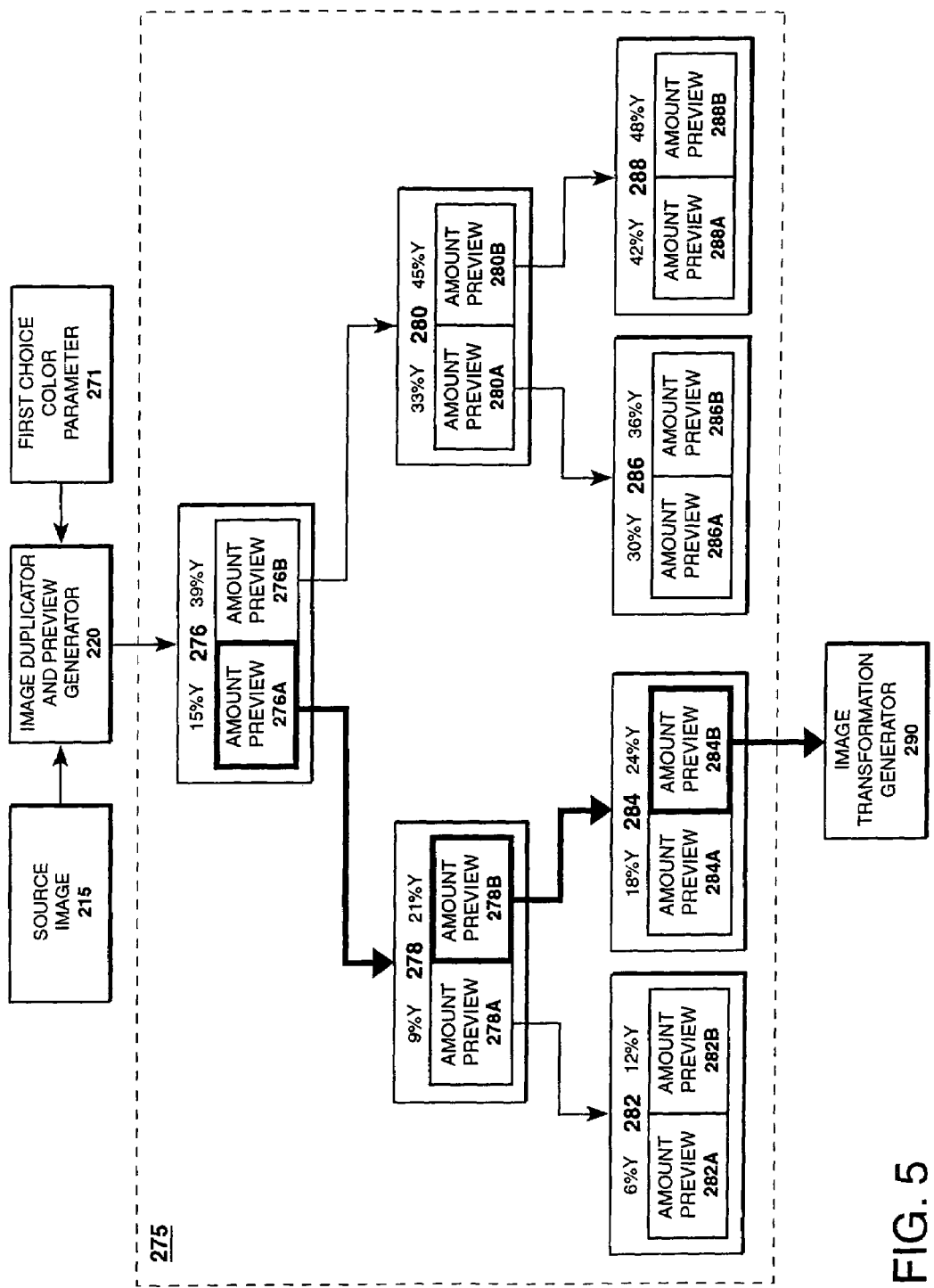
FIG. 5 is a flowchart showing a guided process of the preferred embodiment used to determine a desired parameter amount.

FIG. 5 is a flowchart illustrating the Parameter Amount Controller 275, employing contrariwise preview pairs in a cascading branch structure. This example shows three steps, with eight possible results, but the number of steps and results can be increased or decreased to obtain a different level of precision. In this example, a First Choice Color Parameter 271 (e.g. Y) is used, but the same process can be used to determine an amount for any parameter. Once a parameter has been determined, the parameter amount is selected by comparing a series of predefined contrariwise preview pairs. Each successive step compares two previews predicated on the user's choice from the previous step. To begin, the Image Duplicator and Preview Generator 220 creates a pair of contrariwise previews 276, using the Source Image 215, the Selected Parameter 271 (e.g. Y), and two predefined parameter amounts (e.g. 15% Y and 39% Y). The user visually compares the contrariwise preview pair and chooses the most preferred preview. In this example, Amount Preview 276A (e.g. 15% Y) was selected, as indicated by the thick outline. Again, the Image Duplicator and Preview Generator 220 creates a pair of contrariwise previews 278, using the Source Image 215, the Selected Parameter 271, and two predefined parameter amounts (e.g. 9% and 21% Y) based on the user's previous selection. The user visually compares the contrariwise preview pair and chooses the most preferred preview. In this example, Amount Preview 278B (21% Y) is selected. After the selection in step two has been made, the Image Duplicator and Preview Generator 220 creates a third pair of contrariwise previews 284, using the Source Image 215, the Selected Parameter 271, and two predefined parameter amounts (e.g. 18% Y and 24% Y) based on the previous selection. In this example, Amount Preview 284B (e.g. 24% Y) is selected as the final color parameter amount. The transformation generator 290 is used to record and/or apply the transformation to the source image.

Figure 6:
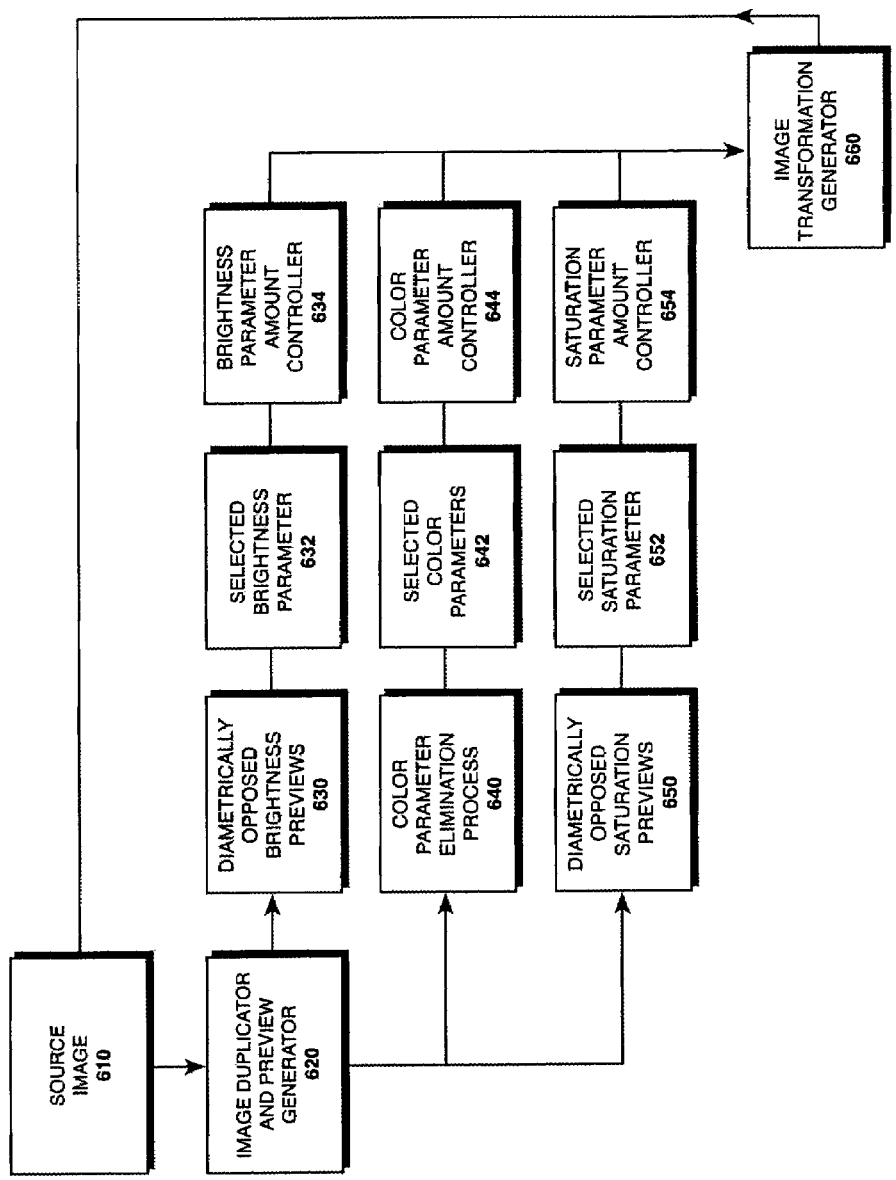
FIG. 6 is a flowchart showing a guided process used to determine a desired brightness, color, and saturation transformation.

A flowchart in FIG. 6 details a guided process of the present invention employing diametrically opposed or contrariwise previews used to determine a brightness, color, and saturation transformation. A source image 610 is created or acquired through any number of different means such as a scanner or digital camera. At a step 620 the source image is duplicated and diametrically opposed or contrariwise previews are created using a brightness processing function. A pair of diametrically opposed or contrariwise brightness previews 630 is displayed. The user visually compares the diametrically opposed or contrariwise previews and chooses the most preferred preview from the pair to obtain a selected brightness parameter 632. Next, the brightness parameter amount controller 634 is used to determine a brightness parameter amount. The Image Transformation Generator 660 applies the brightness transformation to the source image 610. The Image Duplicator and Preview Generator 620 creates a new set of diametrically opposed or contrariwise previews using color processing functions. The color parameter elimination process controller 640 displays a series of preview comparisons. The most appealing preview is selected in each step of the sequential elimination process until only the most preferred parameters remain at a step 642. Next, the Color Parameter Amount Controller 644 is used to determine the color parameter amounts. The Image Transformation Generator 660 applies the color transformation to the source image 610, and the Image Duplicator and Preview Generator 620 creates a new set of diametrically opposed or contrariwise previews using a saturation processing function. The user visually compares the diametrically opposed or contrariwise saturation previews and chooses the most preferred preview from the pair to obtain a Selected Saturation Parameter 652. Next, the Saturation Parameter Amount Controller 654 is used to determine a saturation parameter amount. The Image Transformation Generator 660 applies the saturation transformation to the source image or combines the brightness, color, and saturation transformations into a single image transformation and applies the transformation to the source image to obtain a desired image.

Figure 7:
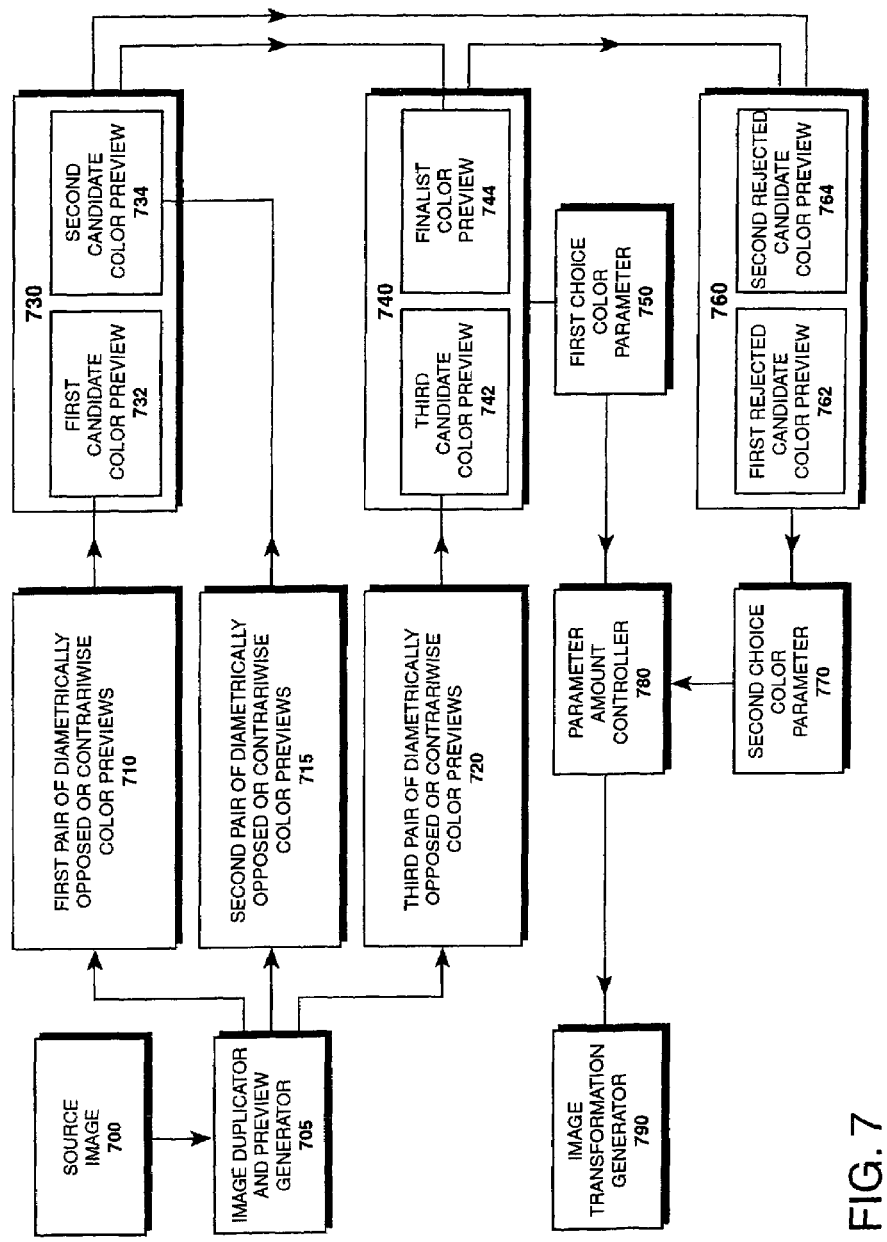
FIG. 7 is a flowchart showing a guided process of an alternative embodiment used to determine a desired color transformation.

FIG. 7 is a flowchart showing an alternative embodiment of the present invention employing diametrically opposed or contrariwise previews used to determine a desired color transformation. A Source Image 700 is acquired through any number of different means such as a scanner or digital camera. At step 705 the source image is duplicated and diametrically opposed or contrariwise previews are generated using a first pair of color parameters to produce a First Pair of Diametrically Opposed or Contrariwise Color Previews 710. The user chooses the most preferred preview from the pair, which is recorded for later use as a First Candidate Color Preview 732. Next, Image Duplicator and Preview Generator 705 uses the Source Image 700 and a second pair of color parameters to create a Second Pair of Diametrically Opposed or Contrariwise Color Previews 715. The user chooses the most preferred preview from the pair, which is recorded for later use as a Second Candidate Color preview 734. A Third Pair of Diametrically Opposed or Contrariwise Color Previews 720 is created by the Image Duplicator and Preview Generator 705 using the Source Image 700 and a third pair of color parameters. The user chooses the most preferred preview from the pair, which is recorded for later use as a Third Candidate Color preview 742. At a step 730, a pair of contrariwise previews containing First Candidate Color preview 732 and Second Candidate Color preview 734 is compared. The user chooses the most preferred preview from the pair, where the selected preview is recorded for later use as a Finalist Color preview 744, and the unselected preview becomes a First Rejected Candidate Color preview 762. At step 740 Finalist Color preview 744 is compared with a Third Candidate Color preview 742. Again, the user chooses the most preferred preview from the pair, where the select preview becomes a First Choice Parameter 750, and the unselected preview becomes Second Rejected Candidate Color preview 764. At a step 760 First Rejected Candidate Color preview 762 and Second Rejected Candidate Color preview 764 are compared. The user chooses the most preferred preview from the pair, which is recorded as a Second Choice Color Parameter 770. The amount for the first and second choice color parameters is determined using the Parameter Amount Controller 780. This can be achieved through a number of different means, including the use of sliders, preview images, incremental image arrays, or through the use of a series of contrariwise previews. The amount of the first choice and second choice color parameters may be determined separately or simultaneously. Once the parameter amounts have been determined, the Image Transformation Generator 790 is used to record and/or transform the source image. The final color transformation may include both a first choice and second choice color parameters, or only a single color parameter, if one of the amounts is deemed to be insignificant.

ALTERNATIVE EMBODIMENTS

In the practice of the present invention, the guided color correction system employing diametrically opposed or contrariwise previews can be performed in a number of different ways. Instead of displaying two simultaneous previews, as the preferred embodiment describes, the guided system could display three, four, five, or six concurrent previews. In addition, the preliminary steps could be paired off using any combination of primary colors, secondary colors, or tertiary colors. Alternatively, the parameter amounts could be altered during the step-by-step process, instead of determining the amount at the end. The finalist preview could be selected by visually comparing the three candidate previews, or the candidate preview with the greatest amount of transformation would be deemed the finalist preview.

While the foregoing invention has been described in connection with what is considered the most practical and preferred embodiment or embodiments thereof, it will be understood that the invention delineated herein is not limited to the disclosed embodiment(s) alone, but is intended to cover various arrangements included within the spirit and scope of the broadest interpretations and equivalent arrangements thereof as conceived by the attached claims.

The invention claimed is:

1. A guided color correction system comprising the steps of:
   obtaining a source image,
   duplicating said source image to obtain a duplicate pair of preview images,
   recording said duplicate pair of preview images,
   applying a first pair of diametrically opposed complementary color parameter transformations to said duplicate pair of preview images to obtain a first pair of diametrically opposed complementary color preview images,
   selecting a preferred preview from said first pair of diametrically opposed complementary color preview images to obtain a first candidate color parameter preview,
   applying a second pair of diametrically opposed complementary color parameter transformations to said duplicate pair of preview images to obtain a second pair of diametrically opposed complementary color preview images,
   selecting a preferred preview from said second pair of diametrically opposed complementary color preview images to obtain a second candidate color parameter preview,
   applying a third pair of diametrically opposed complementary color parameter transformations to said duplicate pair of preview images to obtain a third pair of diametrically opposed complementary color preview images,
   selecting a preferred preview from said third pair of diametrically opposed complementary color preview images to obtain a third candidate color parameter preview,
   displaying a first pair of contrariwise preview images containing said first candidate color parameter preview and said third candidate color parameter preview,
   selecting a preferred preview from said first pair of contrariwise preview images where the selected preview becomes a finalist color parameter preview and the unselected preview becomes a first rejected candidate color parameter preview,
   displaying a second pair of contrariwise preview images containing said second candidate color parameter preview and said finalist color parameter preview,
   selecting a preferred preview from said second pair of contrariwise preview images where the selected preview becomes a first choice color parameter and the unselected preview becomes a second rejected candidate color parameter preview,
   displaying a third pair of contrariwise preview images containing said first rejected candidate color parameter preview and said second rejected candidate color parameter preview,
   selecting a preferred preview from said third pair of contrariwise preview images to obtain a second choice color parameter,
   determining an amount of said first choice color parameter and said second choice color parameter to obtain a color transformation,
   applying said color transformation to said source image to obtain a desired image.

2. A guided color correction system comprising the steps of:
   obtaining a source image,
   duplicating said source image to obtain a duplicate pair of preview images, recording said duplicate pair of images,
applying a first pair of diametrically opposed color parameter transformations to said duplicate pair of preview images to obtain a first pair of diametrically opposed preview images,
selecting a preferred preview from said first pair of diametrically opposed preview images to obtain a first candidate color parameter preview,
applying a second pair of diametrically opposed color parameter transformations to said duplicate pair of preview images to obtain a second pair of diametrically opposed preview images,
selecting a preferred preview from said second pair of diametrically opposed preview images to obtain a second candidate color parameter preview,
applying a third pair of diametrically opposed color parameter transformations to said duplicate pair of preview images to obtain a third pair of diametrically opposed preview images,
selecting a preferred preview from said third pair of diametrically opposed preview images to obtain a third candidate color parameter preview,
displaying a fourth pair of diametrically opposed preview images containing said first candidate color parameter preview and said third candidate color parameter preview,
selecting a preferred preview from said first pair of diametrically opposed preview images where the selected preview becomes a finalist color parameter preview and the unselected preview becomes a first rejected candidate color parameter preview,
displaying a fifth pair of diametrically opposed preview images containing said second candidate color parameter preview and said finalist color parameter preview,
selecting a preferred preview from said fifth pair of diametrically opposed preview images where the selected preview becomes a first choice color parameter and the unselected preview becomes a second rejected candidate color parameter preview,
displaying a sixth pair of diametrically opposed preview images containing said first rejected candidate color parameter preview and said second rejected candidate color parameter preview,
selecting a preferred preview from said sixth pair of diametrically opposed preview images to obtain a second choice color parameter,
determining an amount of said first choice color parameter and said second choice color parameter to obtain a color transformation,
applying said color transformation to said source image to obtain a desired image.

3. A guided color correction system according to claim 2, wherein said diametrically opposed color parameter is a contrariwise color parameter.

4. A guided color correction system according to claim 2, wherein said diametrically opposed preview image is a contrariwise preview image.

5. A guided color correction system comprising the steps of:
obtaining a source image,
duplicating said source image to obtain a duplicate pair of preview images,
recording said duplicate pair of preview images,
defining a first pair of primary and secondary complementary colors,
applying a first pair of diametrically opposed transformations of said first pair of primary and secondary complementary colors to said duplicate pair of preview images to obtain a first pair of diametrically opposed complementary color preview images,
displaying said first pair of diametrically opposed complementary color preview images,
selecting a preferred preview from said first pair of diametrically opposed complementary color preview images to obtain a first candidate color parameter preview,
defining a second pair of complementary colors using tertiary colors that are perpendicular on the color wheel to said first pair of primary and secondary complementary colors,
applying a second pair of diametrically opposed transformations of said second pair of complementary colors to said duplicate pair of preview images to obtain a second pair of diametrically opposed complementary color preview images,
displaying said second pair of diametrically opposed complementary color preview images,
selecting a preferred preview from said second pair of diametrically opposed complementary color preview images to obtain a tertiary color parameter,
extracting a primary and a secondary color parameter from said tertiary color parameter to obtain a second candidate color parameter and a third candidate color parameter,
applying a pair of contrariwise color transformations of said second candidate color parameter and said third candidate color parameter to said duplicate pair of preview images to obtain a second candidate color parameter preview and a third candidate color parameter preview,
displaying a first pair of contrariwise color preview images containing said first candidate color parameter preview and said third candidate color parameter preview,
selecting a preferred preview from said first pair of contrariwise color preview images to obtain a finalist color parameter preview,
displaying a second pair of contrariwise color preview images containing said second candidate color parameter preview and said finalist color parameter preview,
selecting a preferred preview from said second pair of contrariwise color preview images where the selected preview becomes a first choice color parameter and the unselected preview becomes a second choice color parameter,
determining an amount of said first choice color parameter and said second choice color parameter to obtain a color transformation,
applying said color transformation to said source image to obtain a desired image.

6. A guided color correction system comprising the steps of:
obtaining a source image,
duplicating said source image to obtain a pair of preview images,
recording said pair of preview images,
selecting a first pair of color parameters,
applying diametrically opposed transformations of said first pair of color parameters to said pair of preview images to obtain a first pair of color parameter preview images,
displaying said first pair of color parameter preview images, selecting a preferred preview from said first pair of color parameter preview images to obtain a first candidate color parameter preview,
recording said first candidate color parameter preview,
selecting a second pair of color parameters,
applying diametrically opposed transformations of said second pair of color parameters to said pair of preview images to obtain a second pair of color parameter preview images,
displaying said second pair of color parameter preview images,
selecting a preferred preview from said second pair of color parameter preview images to obtain a second candidate color parameter preview,
recording said second candidate color parameter preview,
selecting a third pair of color parameters,
applying diametrically opposed transformations of said third pair of color parameters to said pair of preview images to obtain a third pair of color parameter preview images,
displaying said third pair of color parameter preview images,
selecting a preferred preview from said third pair of color parameter preview images to obtain a third candidate color parameter preview,
recording said third candidate color parameter preview,
displaying a first pair of candidate preview images containing said first candidate color parameter preview and said second candidate color parameter preview,
selecting a preferred preview from said first pair of candidate preview images to obtain a finalist color parameter preview,
recording said finalist color parameter preview,
displaying a second pair of candidate preview images containing said third candidate color parameter preview and said finalist color parameter preview,
selecting a preferred preview from said second pair of candidate preview images to obtain a first choice color parameter,
determining an amount of said first choice color parameter to obtain a color transformation,
applying said color transformation to said source image to obtain a desired image.

7. A guided color correction system according to claim 6, wherein said diametrically opposed transformations are contrariwise transformations.

8. A guided color correction system comprising the steps of:
obtaining a source image,
duplicating said source image to obtain a pair of preview images,
recording said pair of preview images,
selecting a first pair of complementary color parameters,
applying diametrically opposed transformations of said first pair of complementary color parameters to said pair of preview images to obtain a first pair of complementary color preview images,
displaying said first pair of complementary color preview images,
selecting a preferred preview from said first pair of complementary color preview images to obtain a first candidate color parameter preview,
recording said first candidate color parameter preview,
selecting a second pair of complementary color parameters,
applying diametrically opposed transformations of said second pair of complementary color parameters to said pair of preview images to obtain a second pair of complementary color preview images,
displaying said second pair of complementary color preview images,
selecting a preferred preview from said second pair of complementary color preview images to obtain a second candidate color parameter preview,
recording said second candidate color parameter preview,
selecting a third pair of complementary color parameters,
applying diametrically opposed transformations of said third pair of complementary color parameters to said pair of preview images to obtain a third pair of complementary color preview images,
displaying said third pair of complementary color preview images,
selecting a preferred preview from said third pair of complementary color preview images to obtain a third candidate color parameter preview,
recording said third candidate color parameter preview,
displaying a first pair of candidate preview images containing said first candidate color parameter preview and said second candidate color parameter preview,
selecting a preferred preview from said first pair of candidate preview images to obtain a finalist color parameter preview,
recording said finalist color parameter preview,
displaying a second pair of candidate preview images containing said third candidate color parameter preview and said finalist color parameter preview,
selecting a preferred preview from said second pair of candidate preview images to obtain a first choice color parameter,
determining an amount of said first choice color parameter to obtain a color transformation,
applying said color transformation to said source image to obtain a desired image.

9. A guided color correction system comprising the steps of:
obtaining a source image,
duplicating said source image to obtain a pair of preview images,
recording said pair of preview images,
defining a first pair of complementary color parameters,
applying diametrically opposed transformations of said first pair of complementary color parameters to said pair of preview images to obtain a first pair of color parameter preview images,
displaying said first pair of color parameter preview images,
selecting a preferred preview from said first pair of color parameter preview images to obtain a first candidate color parameter preview,
recording said first candidate color parameter preview,
defining a second pair of color parameters using parameters located on either side of the shared axis of said first pair of complementary color parameters,
applying diametrically opposed transformations of said second pair of color parameters to said pair of preview images to obtain a second pair of color parameter preview images,
displaying said second pair of color parameter preview images,
selecting a preferred preview from said second pair of color parameter preview images to obtain a second candidate color parameter preview,
recording said second candidate color parameter preview, defining a third candidate color parameter that combines with said first candidate color parameter preview and said second candidate color parameter preview to form three contiguous color parameters, creating a third candidate color parameter preview from said third candidate color parameter, recording said third candidate color parameter preview, displaying a first pair of candidate color preview images using two non-adjacent candidate color parameter previews from said first candidate color parameter preview and said second candidate color parameter preview and said third candidate color parameter preview, selecting a preferred preview from said first pair of candidate color preview images to obtain a finalist color parameter preview, recording said finalist color parameter preview, displaying a second pair of candidate color preview images containing said finalist color parameter preview and the candidate color parameter preview that was not used in said first pair of candidate color preview images, selecting a preferred preview from said second pair of candidate color preview images where the selected preview becomes a first choice color parameter and the unselected preview becomes a second choice color parameter, determining an amount of said first choice color parameter and said second choice color parameter to obtain a color transformation, applying said color transformation to said source image to obtain a desired image.

10. A guided color correction system according to claim 9, wherein said diametrically opposed transformations are contrariwise transformations.

11. A guided color correction system comprising the steps of:

obtaining a source image, duplicating said source image to obtain a pair of preview images, recording said pair of preview images, defining a first pair of color parameters, applying diametrically opposed transformations of said first pair of color parameters to said pair of preview images to obtain a first pair of color parameter preview images, displaying said first pair of color parameter preview images, providing a means of adjusting the transformation amount of said first pair of color parameter preview images, selecting a preferred preview from said first pair of color parameter preview images to obtain a first candidate color parameter preview, recording said first candidate color parameter preview, defining a second pair of color parameters, applying diametrically opposed transformations of said second pair of color parameters to said pair of preview images to obtain a second pair of color parameter preview images, displaying said second pair of color parameter preview images, providing a means of adjusting the transformation amount of said second pair of color parameter preview images, selecting a preferred preview from said second pair of color parameter preview images to obtain a second candidate color parameter preview, recording said second candidate color parameter preview, defining a third pair of color parameters, applying diametrically opposed transformations of said third pair of color parameters to said pair of preview images to obtain a third pair of color parameter preview images, displaying said third pair of color parameter preview images, providing a means of adjusting the transformation amount of said third pair of color parameter preview images, selecting a preferred preview from said third pair of color parameter preview images to obtain a third candidate color parameter preview, recording said third candidate color parameter preview, determining the most preferred candidate color parameter from said first candidate color parameter preview and said second candidate color parameter preview and said third candidate color parameter preview to obtain a color transformation, applying said color transformation to said source image to obtain a desired image.

12. A guided color correction system according to claim 11, wherein said diametrically opposed transformations are contrariwise transformations.

* * * * *